(12) United States Patent
Aihara et al.

(10) Patent No.: US 7,184,645 B2
(45) Date of Patent: Feb. 27, 2007

(54) SEPARATOR FOR OPTICAL-FIBER TAPE

(75) Inventors: Yutaka Aihara, Sakura (JP); Takeshi Sato, Sakura (JP)

(73) Assignee: Fujikura Ltd., Tokyo (JP)

( * ) Notice: Subject to any disclaimer, the term of this patent is extended or adjusted under 35 U.S.C. 154(b) by 128 days.

(21) Appl. No.: 11/020,229

(22) Filed: Dec. 27, 2004

(65) Prior Publication Data

US 2005/0152661 A1    Jul. 14, 2005

(30) Foreign Application Priority Data

Jan. 9, 2004    (JP)    ............... P2004-004437

(51) Int. Cl.
*G02B 6/00*    (2006.01)
(52) U.S. Cl. ...................... 385/134; 385/147
(58) Field of Classification Search .............. None
See application file for complete search history.

(56) References Cited

U.S. PATENT DOCUMENTS 4,276,798 A * 7/1981 Gottschalk ............... 83/430

FOREIGN PATENT DOCUMENTS

| JP | 08-005843 | 1/1995 |
|---|---|---|
| JP | 07-113915 | 5/1995 |
| JP | 09-197166 | 7/1997 |
| JP | 2003-084144 | 3/2003 |

* cited by examiner

*Primary Examiner*—Rodney Bovernick
*Assistant Examiner*—Mike Stahl
(74) *Attorney, Agent, or Firm*—Sughrue Mion, PLLC (57) ABSTRACT

A separator for an optical-fiber tape, the optical-fiber tape including a group of optical-fibers extending in parallel with each other, the separator including a supporting member configured to support a length of the optical-fiber tape along a first lateral edge thereof, a positioner configured to apply a resilient force to the length of the optical fiber tape along a second lateral edge thereof, wherein the first lateral edge and second lateral edge are on opposite sides of the optical fiber tape; and a separation member configured to separate a first portion of the length of the optical-fiber tape by shearing the optical-fiber tape along the direction of extension of the group of optical fibers.

26 Claims, 6 Drawing Sheets

SEPARATOR FOR OPTICAL-FIBER TAPE

CROSS-REFERENCE TO RELATED APPLICATIONS

This application is based upon and claims the benefit of priority from Japanese Patent Application No. 2004-004437 filed on Jan. 9, 2004 in the Japanese Patent Office, the entire contents of which are incorporated herein by reference.

BACKGROUND OF THE INVENTION

The invention relates to an optical-fiber tape separator, and, specifically, to a separator for an optical-fiber tape which positions an optical-fiber tape at a certain separation location.

Separators for an optical-fiber tape are disclosed in Japanese Patent Application publication Laid-open No. 2003-84144, No. Hei7-113915, No. Hei8-5843 and No. Hei9-197166.

Such separators include a pair of upper and lower separation-blades in a rectangular section, where one of the separation-blades slides so that the right corners of the separation-blades pass each other. The separator includes a channel between a lower separation-blade and a wall. The channel has a width equal to or greater than the thickness of an optical-fiber tape.

SUMMARY OF THE INVENTION

These separators, however, require change and adjustment in the channel-depth, or adjustment in a press-down mechanism used to press against the optical-fiber tape, every time an optical-fiber tape with a different width is inserted into the channel. This causes complicated operations, thus lowering the efficiency of productivity.

The invention is directed to a separator for an optical-fiber tape which positions an optical-fiber tape at a certain location for efficient separation, with optical-fiber tapes having different widths in respective production lots.

A first aspect of the invention provides a separator for an optical-fiber tape, where the optical-fiber tape includes a group of optical-fibers extending in parallel with each other. The separator includes: a supporting member configured to support a length of the optical-fiber tape along a first lateral edge thereof; a positioner configured to apply a resilient force to the length of the optical fiber tape along a second lateral edge thereof, wherein the first lateral edge and second lateral edge are on opposite sides of the optical-fiber tape; and a separation member configured to separate a first portion of the length of the optical-fiber tape by shearing the optical-fiber tape along the direction of extension of the group of optical fibers.

The positioner may compress the optical fiber tape to correct errors in a width of the optical-fiber tape to maintain alignment of the separation member and a separation location of the optical-fiber tape.

The supporting member may support the length of the optical-fiber tape in a supporting direction perpendicular to the direction of extension of the group of optical fibers.

The positioner may apply a resilient force along the length of the optical-fiber tape in a resilient force direction perpendicular to the direction of extension of the group of optical fibers.

The supporting member may further include a channel wherein a second portion of the length of the optical-fiber tape is contained, where the second portion of the length of the optical-fiber tape corresponds to a remainder of the length of the optical-fiber tape not including the first portion, and where the first portion of the length of the optical-fiber tape extends from an edge of the supporting member to an outer surface of the positioner.

The optical-fiber tape may be planar.

The positioner may be a spring, a spring and press plate, a pressure cylinder, or an elastic body.

The positioner may also be a material having an elastic force, or a material having an elastic force and a material free from elastic force. In either case, the material having an elastic force may be formed from an original material that is free from elastic force.

A second aspect of the invention provides a separator for an optical-fiber tape, where the optical fiber tape includes a group of optical-fibers. The separator includes: a pair of blades configured so that a length of the optical-fiber tape is contained therebetween, and so that the pair of blades pass each other during operation to shear the length of the optical-fiber tape, thus separating the group of optical-fibers into two groups of optical fibers; and a positioner configured to resiliently press the length of the optical-fiber tape so that the pair of blades are positioned between said two groups of optical fibers.

A first blade of the pair of blades may support the length of the optical-fiber tape along a first lateral edge thereof, and the positioner may resiliently press the length of the optical-fiber tape along a second lateral edge thereof, wherein the first lateral edge and second lateral edge are on opposite sides of the optical fiber tape.

The first blade may support the length of the optical-fiber tape in a supporting direction perpendicular to the direction of extension of the group of optical fibers.

The positioner may apply a resilient force along the length of the optical-fiber tape in a resilient force direction perpendicular to the direction of extension of the group of optical fibers.

The first blade may further include a channel wherein one of the groups of optical fibers is contained.

The pair of blades may have a channel therebetween, and the positioner may resiliently press the length of the optical-fiber tape into the channel so that a lateral edge of the length of the optical-fiber tape is positioned along a bottom of the channel.

The separator may also comprise a plurality of pairs of blades arranged successively on a support structure, where each of the pair of blades has a channel therebetween, and where the positioner extends closer to each successive interface of the pairs of blades on the support structure

BRIEF DESCRIPTION OF THE ACCOMPANYING DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS

Exemplary embodiments of the invention will now be described below with reference to the attached Figures. The described exemplary embodiments are intended to assist the understanding of the invention, and are not intended to limit the scope of the invention in any way.

First Exemplary Embodiment

Figure 1A:
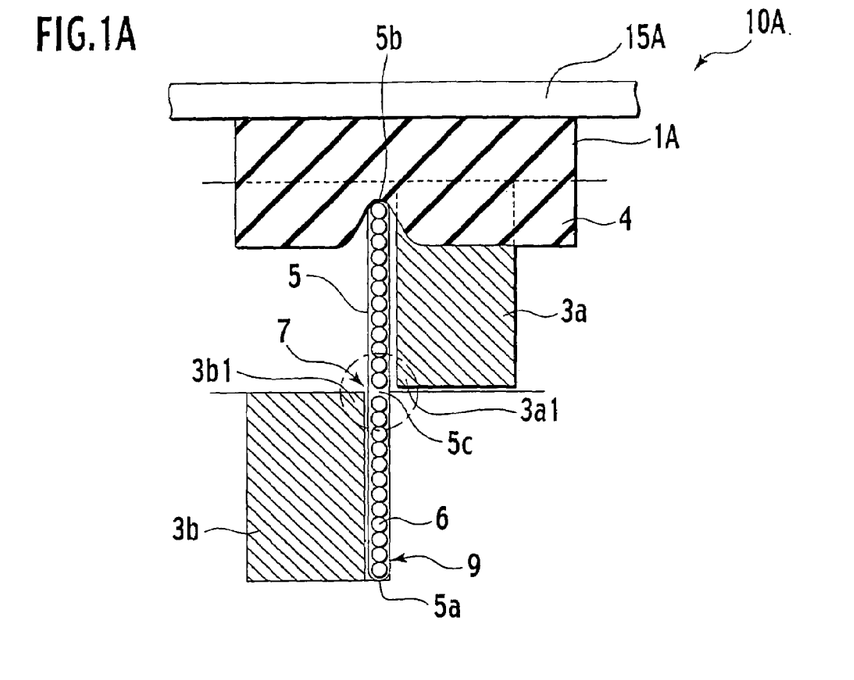
FIG. 1A is a schematic view of a separator for an optical-fiber tape according to a first exemplary embodiment of the invention.

With reference to FIG. 1A, an optical-fiber tape 5 includes a group of optical-fibers 6 arranged parallel to each other. A separator 10A for an optical-fiber tape includes a pair of separation blades 3a, 3b. Separation blades 3a, 3b are positioned at different heights, respectively. The separation blades 3a, 3b have right-angled corners 3a1, 3b1 that pass each other when one of the separation blades 3a, 3b slides in the direction parallel to the other one of the separation blades 3a, 3b. The separation blades 3a, 3b are elongated to extend to the back of FIG. 1A. A separation blade 3b and a wall 9 have a channel 7 therebetween. The channel 7 has a width that is equal to or has a slight allowance relative to the thickness of the optical-fiber tape 5. The channel 7 is also elongated to the back of FIG. 1A. The separator 10A includes an elastic body 1A above the channel 7. The elastic body 1A is fixed to a stationary wall 15A.

The elastic body 1A includes a substance that is deformable when a force is applied thereto, and that recovers its original form when the force is removed. The elastic body 1A normally applies a certain amount of pressure to the optical-fiber tape 5 that is inserted in the channel 7. The pressure is an inherent elastic force of the elastic body 1A. The elastic force is set in magnitude so as not to produce planar distortion of the optical-fiber tape 5. The certain amount of pressure corrects any errors in the width of the optical fiber tape 5 to maintain a constant distance from the lower reference level to the separation location 5c of the optical fiber tape.

The elastic body 1A is constructed of, for example, rubber, plastic, silicon rubber, a tubular structure (e.g., a silicon tube), resin, or highly elastic chemical fiber (e.g, a sponge (EPT (ethylene-propylene terpolymer), neoprene, natural sponge)). Further, the elastic body 1A may be, for example, rubber that has a certain amount of air filled therein, or a resinous complex that has a certain amount of water filled therein.

The elastic body 1A is disposed so as to lessen the width of the optical-fiber tape 5 in a direction transverse to the parallel direction of the optical-fibers 6. The elastic body 1A is formed as, for example, an elongated or shortened plate to press the optical-fiber tape 5 under a constant pressure in its width direction. The elastic bodies as shortened plates may also be positioned at intervals.

The optical-fiber tape 5 includes an optical-fiber ribbon and an optical-fiber ribbon cord. When the optical-fiber ribbon cord is separated, the channel 7 is greater in width than at least the outer size of the cord cover. The optical-fiber tape 5 houses optical-fibers 6. The number of optical-fibers 6 may be, for example, 2, 4, 6, 8, 10 or 12. The number of optical-fibers is not limited to this, and may be an odd number.

The following describes operation of the optical-fiber tape separator 10A.

The transverse end 5a of the optical-fiber tape 5 is inserted in the channel 7 with a previously set width. On the transverse end 5b opposite to the inserted end 5a, the elastic body 1A is disposed to shorten the optical-fiber tape 5 in its width direction. Here, the elastic body 1A may be provided with a stopper so as not to apply more than a certain elastic force to the optical-fiber tape 5. The elastic body 1A may be also provided with a supporting mechanism for supporting the elastic body 1A. The supporting mechanism applies a force to the elastic body 1A in a direction along the width direction of the optical-fiber tape 5.

Figure 1B:
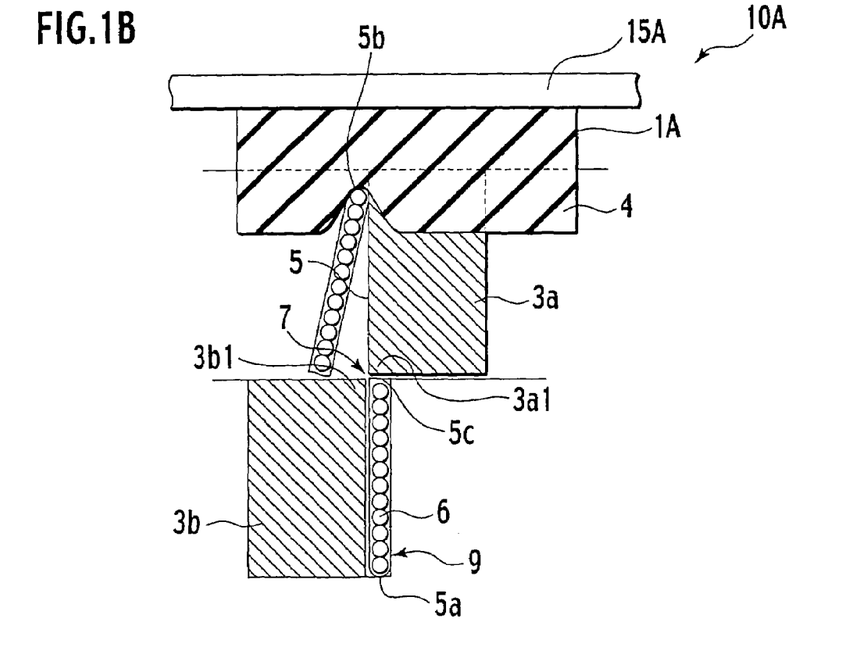
FIG. 1B is a schematic view illustrating operation of the separator in FIG. 1A.

The elastic body 1A applies a certain amount of pressure longitudinally over the optical-fiber tape 5. This allows for a pressing force to be applied to the opposite transverse end Sb, with the transverse end 5a of the optical-fiber tape 5 fixed in the channel 7. The pressing force permits the separation location 5c of the optical-fiber tape 5 to descend within a range of errors in width of the tape, thus coinciding with the contact of the separation blades 3a, 3b. Upon the above setting, the blade 3a slides to pass by the blade 3b, thus separating the optical fiber 5 at the desired separation location 5c, as illustrated in FIG. 1B.

When the optical-fiber tape 5 has errors in width of the tape in every production lot, the elastic body 1A shortens the optical-fiber tape 5 in the width direction to offset the errors, thus easily coinciding the separation location 5c with the contact of the separation blades 3a, 3b. As a result, the separator 10A does not require conventional adjustment in depth of the channel or adjustment in movement of the pressing mechanism. This avoids problems, and achieves an efficient separation operation.

Second Exemplary Embodiment

Figure 2:
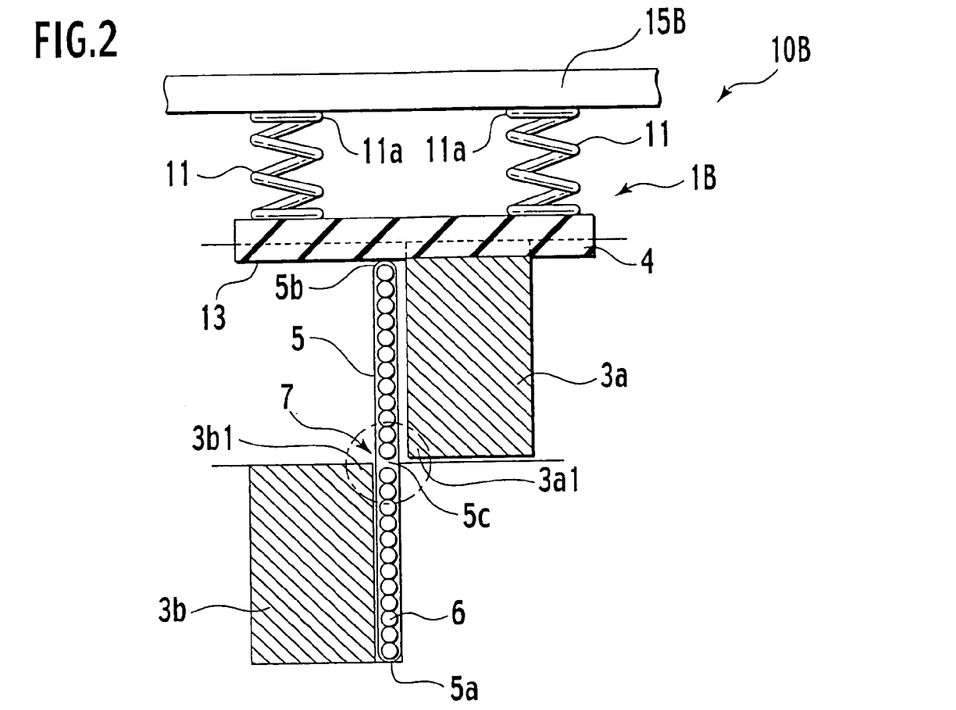
FIG. 2 is a schematic view of a separator for an optical-fiber tape according to a second exemplary embodiment of the invention.

With reference to FIG. 2, an optical-fiber tape separator 10B includes a press mechanism 1B in place of the elastic body 1A. The press mechanism 1B includes springs 11; and a press-plate 13 pressed by the springs 11. The press-plate 13 is disposed longitudinally along the optical-fiber tape 5 to shorten the optical-fiber tape 5 in the width direction. Although two springs are shown in this embodiment, the press-plate 13 may have a single spring 11 disposed thereon.

The springs 11 have ends 11a fixed to a stationary wall 15B. This allows the press-plate 13 to be pressed under a uniform pressure. The springs 11 have a predetermined spring constant to provide a force for shortening the optical-fiber tape 5 from an errorless width of the tape into a regular one.

Each of the springs 11 may be made of metal or plastic, or another material, without any particular limitations. Every feature of the optical-fiber tape 5 is identical with the one in the description of the first embodiment, and is omitted.

The following describes the operation of the optical-fiber tape separator 10B.

The transverse end 5a of the optical-fiber tape 5 is inserted in the channel 7 with a previously set width. On the transverse end 5b opposite to the inserted end 5a, the press-plate 13 and the springs 11 are disposed to shorten the optical-fiber 5 in the width direction.

The springs 11 press against the press-plate 13 under a uniform pressure. The press-plate 13, pressed under a uniform pressure, presses longitudinally against the optical-fiber tape 5 under a constant pressure. This allows a pressing force to be applied to the opposite end 5b, with the transverse end 5a fixed. The pressing force permits the separation location 5c of the optical-fiber tape 5 to descend to offset any errors, thus coinciding the separation location 5c with the contact of the separation blades 3a, 3b. Upon the above setting, the separation blade 3a slides to separate the optical-fiber tape 5 at the separation location 5c.

The press-mechanism 1B is not limited to a spring for an elastic member, and may alternatively employ, for example, a cylinder. For the production of pressure, the cylinder may have a certain amount of a liquid (water, oil or the like) or a gas (air or the like) filled therein.

When the optical-fiber tape 5 has variations in width of the tape in every production lot, the press-mechanism 1B shortens the optical-fiber tape 5 to within a range of the variations in the width direction, thus easily coinciding the separation location 5c with the contact of the blades 3a, 3b. As a result, the separator 10B does not require conventional adjustment in channel-depth or adjustment in movement of the pressing mechanism. This avoids problems, and achieves an efficient separation operation.

Third Exemplary Embodiment

Figure 3:
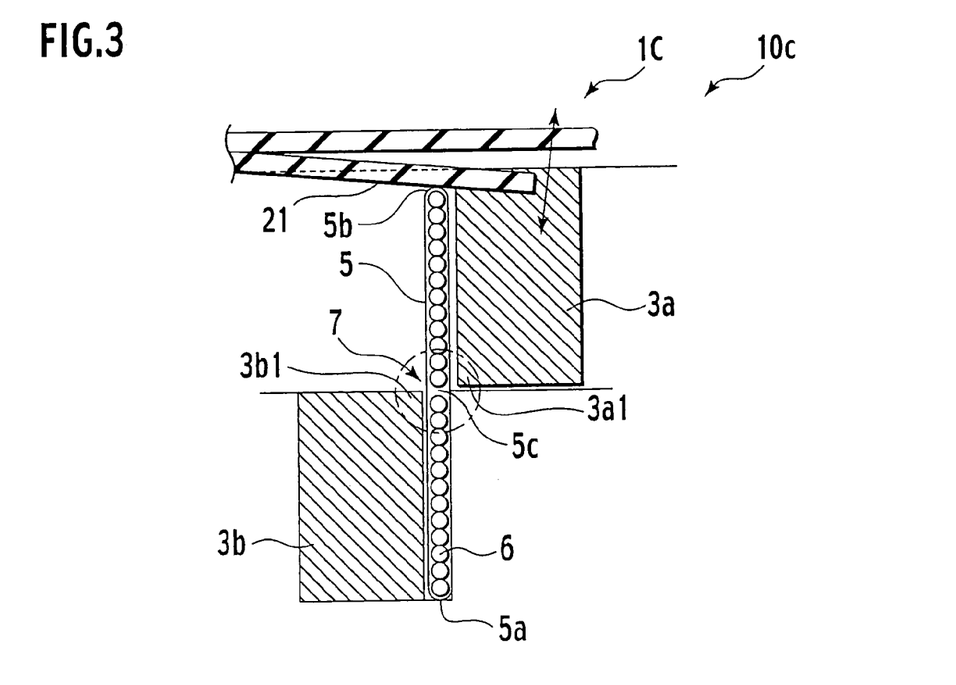
FIG. 3 is a schematic view of a separator for an optical-fiber tape according to a third exemplary embodiment of the invention.

With reference to FIG. 3, an optical-fiber tape separator 10C includes a press-mechanism 1C in place of the elastic body 1A of the first exemplary embodiment. The press-mechanism 1C includes a leaf spring 21 fixed to the stationary wall. The leaf spring 21 swings vertically, using its fixing point as a fulcrum. The leaf spring 21 is disposed longitudinally along the end 5b of the optical-fiber tape 5 to shorten the tape 5 in the width direction. The leaf spring 21 has a certain spring constant and has a force to shorten the optical-fiber tape 5 from an errorless width of the tape to a regular one.

Every feature of the optical-fiber tape 5 is identical with the one in the description of the first exemplary embodiment, and therefore detailed description is omitted here.

The following describes the operation of the optical-fiber tape separator 10C.

The transverse end 5a of the optical-fiber tape 5 is inserted in the channel 7 with a previously set width. On the transverse end 5b opposite to the inserted end 5a, the leaf spring 11 is disposed to shorten the optical-fiber 5 in the width direction. The leaf spring 21 may be provided with a stopper so as not to apply more than a specific force to the optical fiber tape 5.

The leaf spring 21 applies a constant pressure longitudinally over the optical-fiber tape 5 under a certain pressure. This allows for a pressing force to be applied to the opposite end 5b, with the transverse end 5a being fixed in the channel 7. The pressing force permits the separation location 5c of the optical-fiber tape 5 to descend to offset any errors, thus coinciding the separation location 5c with the separation blades 3a, 3b. Upon the above setting, the separation blade 3a slides to separate the optical-fiber tape 5 at the desired separation location 5c.

When the optical-fiber tape 5 has errors in width of the tape in every production lot, the press-mechanism 1C shortens the optical-fiber tape 5 to within a range of the errors in the width direction, thus coinciding the separation location 5c with the contact of the blades 3a, 3b. As a result, the separator 10C does not require conventional adjustment in channel-depth or adjustment in movement of the pressing mechanism. This avoids problems, and achieves an efficient separation operation.

Exemplary Tool

The following describes an exemplary optical-fiber separating tool 100 according to the invention.

Figure 4:
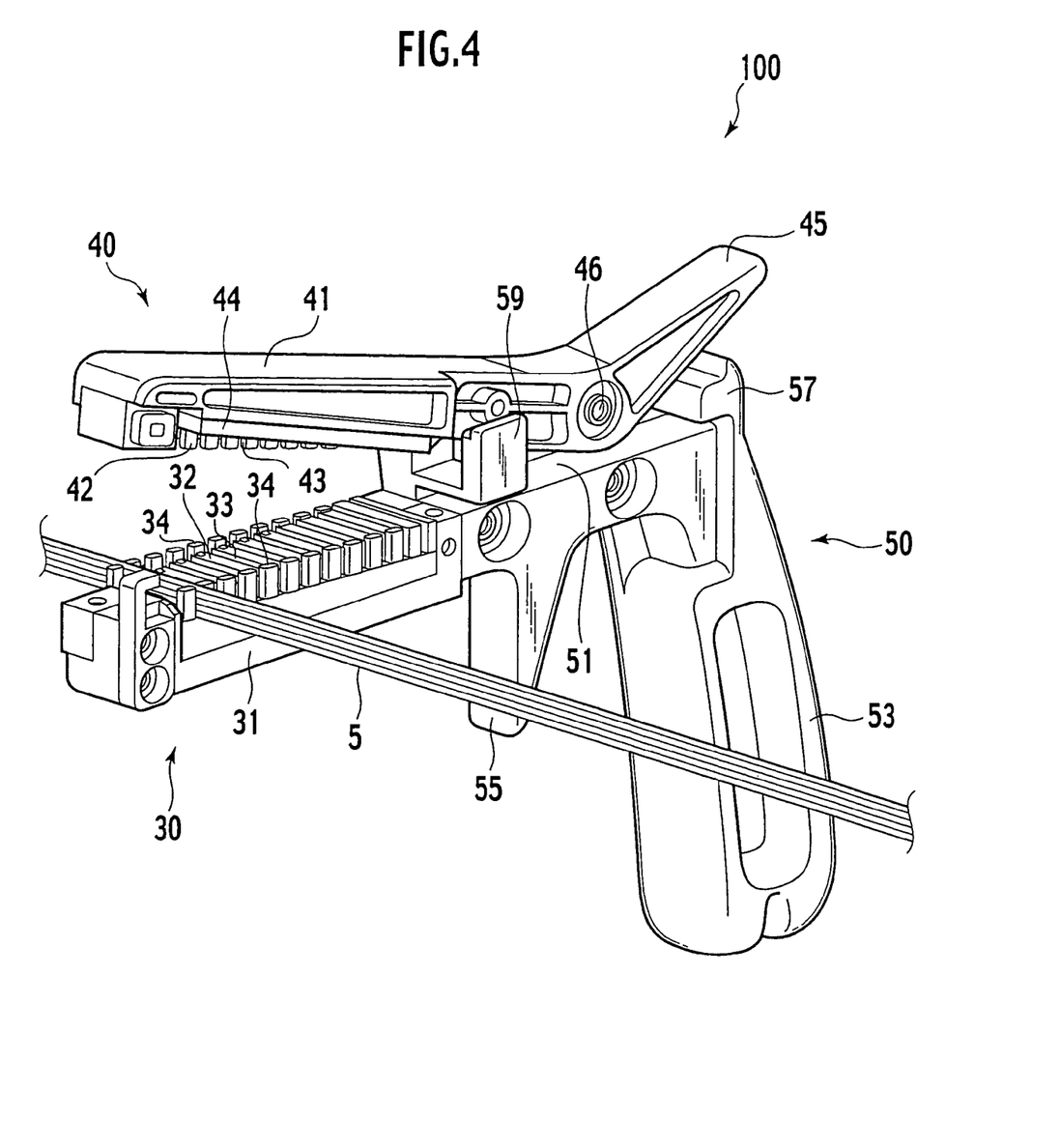
FIG. 4 is a perspective view of an exemplary separation tool for an optical-fiber tape according to the invention.

With reference to FIG. 4, the tool 100 includes a pair of lower and upper cutters 30, 40 (respectively) joined with each other. The tool 100 includes an operation part 50 to operate lower and upper cutters 30, 40.

The lower cutter 30 includes a lower base 31 movably connected to the operating part 50. The lower cutter 30 includes a set of lower bladed members 32 on the lower base 31. The lower cutter 30 also includes a set of lower channels 33 between the lower bladed members 32. The lower cutter 30 also includes two guides 34 at both longitudinal ends of respective lower bladed members 32.

The upper cutter 40 includes an upper base 41 and a lever 45 integral with each other. The upper cutter 40 includes a set of upper bladed members 42 on the upper base 41. The upper cutter 40 also includes a set of upper channels 43 between the upper bladed members 42. The upper cutter 40 also includes a sponge rubber 44 as a positioner fixed onto the upper base 41. The upper cutter 40 further includes a hinge 46 rotatably supported on the operation part 50.

The operation part 50 includes a support 51 supporting the upper cutter 40 via the hinge 46. The operation part 50 also includes a grip 53 extending from the end of support 51. The operation part 50 also includes a trigger 55 extending parallel to the grip 53 from the support 51. The operation part 50 further includes a stopper 57 mounted to the end of support 51 for receiving the lever 45. The operation part 50 also includes a U-shaped guide 59 on the support 51 for the upper base 41.

Figure 5:
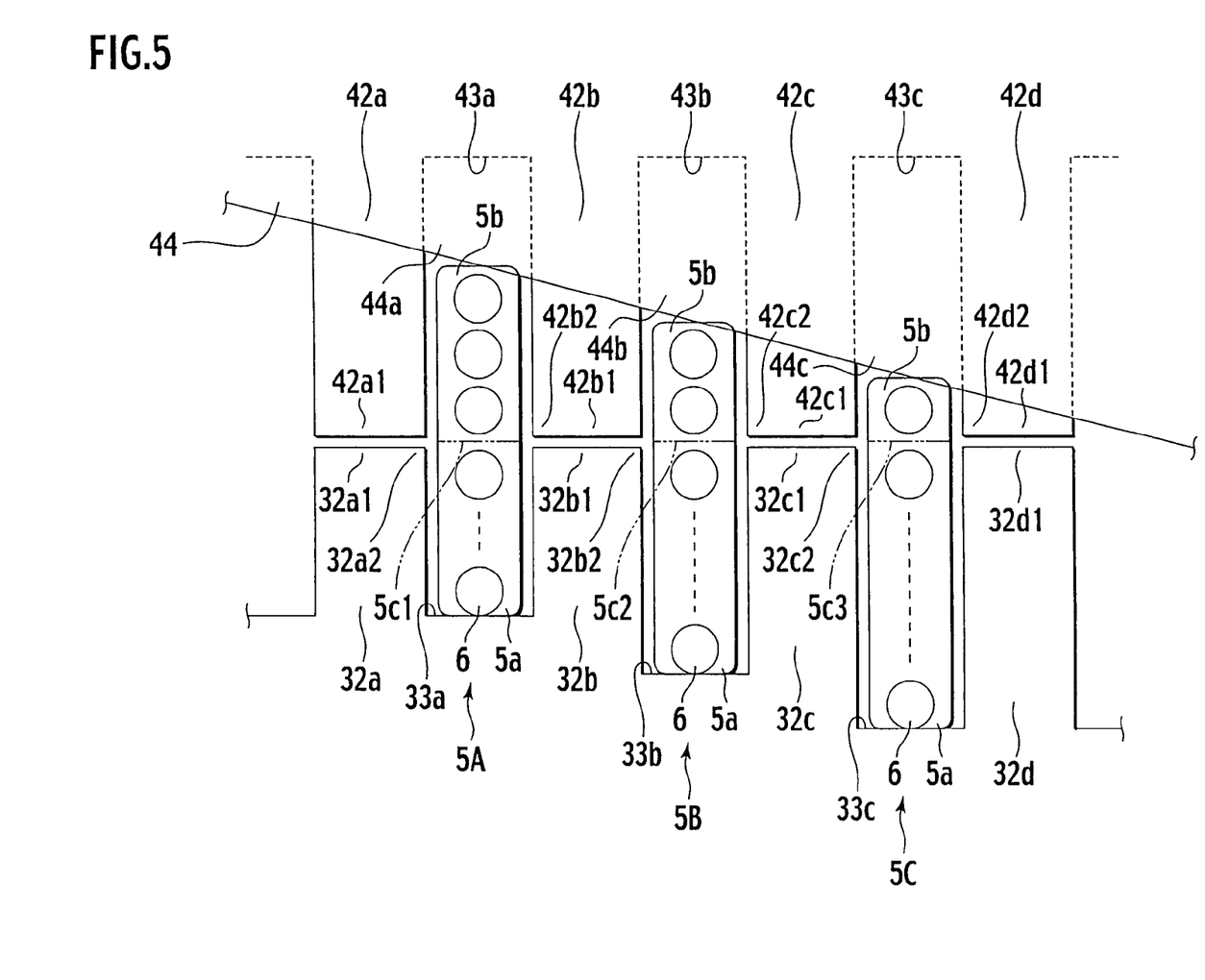
FIG. 5 is an enlarged elevation view of the separation tool in FIG. 4.

Specifically, with reference to FIG. 5, the set of lower bladed member 32 includes lower bladed members 32a, 32b, 32c, 32d spaced from each other. The lower bladed members 32a to 32d have distal ends 32a1, 32b1, 32c1, 32d1 flush with each other. The lower bladed member 32a to 32d have right corners 32a2, 32ab2, and 32c2 as blades at the distal ends 32a1, 32b1, 32c2, respectively.

The set of lower channels 33 have lower channels 33a, 33b, 33c between the lower bladed members 32a to 32d. The lower channels 33a to 33c have different depths in correspondence with the number of optical-fibers, respectively.

The set of upper bladed members 42 includes upper bladed members 42a, 42b, 42c, 42d spaced from each other. The upper bladed members 42a to 42d coincide with the lower bladed members 32a to 32d in horizontal positions, respectively. The upper bladed members 42a to 42d have distal ends 42a1, 42b1, 42c1, 42d1 flush with each other. The distal ends 42a1 to 42d1 are positioned in proximity to the distal ends 32a1 to 32d1, with clearances therebetween. The upper bladed members 42b to 42d have right corners 42b2, 42c2, 42d2 as blades at the distal ends 42b1 to 42d3, respectively. The corners 42b2, 42c2, 42c3 are opposed to the corners 32a2, 32b2, 32c2, respectively. The corners 42b2, 42c2, 42d2 are mated with the corners 32a2, 32b2, 32c2 for shearing of the optical-fiber tapes 5A to 5C, respectively.

The set of upper channels 43 have upper channels 43a, 43b, 43c between the upper bladed members 42a to 42d. The upper channels 43a to 43c have depths identical to each other.

The sponge rubber 44 extends across the upper bladed members 42a to 42d. The sponge rubber 44 has an oblique distal end 44a, 44b or 44c positioned between the distal and proximal ends of the upper bladed members 42a to 42d. The distal end of the sponge rubber 44 comes vertically closer to the distal ends 42a1 to 42d1 of the blades, as the channels 33a to 33c deepen.

For example, the tool 100 is adapted for the optical-fiber tapes 5A, 5B, 5C with twelve optical-fibers 6. The lower channel 33a houses a portion of the tape 5A with nine optical-fibers 6 piled on each other, the upper channel 43a houses a portion of the tape 5B with the three remaining optical-fibers 6, and a separation location 5c1 is positioned between the respective groups of nine and three optical-fibers 6.

Further, the lower channel 33b houses a portion of the tape 5B with ten optical-fibers 6 piled on each other, the upper channel 43b houses a portion of the tape 5B with the two remaining optical-fibers 6, and a separation location 5c2 is positioned between the respective groups of ten and two optical-fibers 6.

Still further, the lower channel 33c houses a portion of the tape 5C with eleven optical-fibers 6, the upper channel 43c houses a portion of the tape 5C with the one remaining optical-fiber 6, and a separation location 5c3 positioned is between the respective groups of nine and one optical-fibers 6.

The sponge rubber 44 resiliently and vertically presses the ends 5b of the optical-fiber tapes 5A to 5C to position the ends 5a of the optical-fiber tapes 5 on the bottoms of channels 33a to 33c. This allows the separation locations 5c1, 5c2, 5c3 to be positioned vertically to the corners 32a2 and 42b2, 32b2 and 42c2, 32c2 and 42d2, respectively.

The following describes the operation of the separation tool 100 for the optical-fiber tape.

Figure 6A:
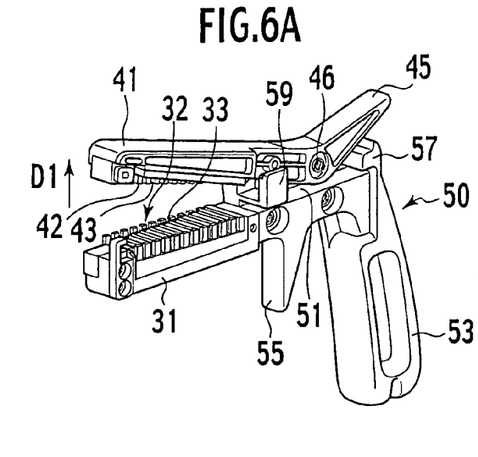
FIGS. 6A to 6E are perspective views for illustrating the operation of the separation tool in FIG. 4.

With reference to FIG. 6A, the lever 45 is pushed toward the stopper 57. This operation allows the upper cutter 40 to swing on the hinge 46, thus rotating the upper base 41 along the guide 59 in the direction of D1. This motion allows the set of upper bladed members 42 to be separated from the set of lower bladed members 32.

Figure 6B:
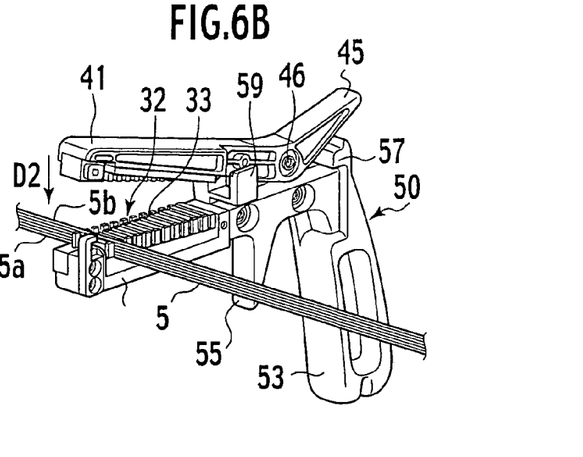

With reference to FIG. 6B, the transverse end 5a of the optical-fiber tape 5 is inserted in a lower channel 33 to approach the bottom of the lower channel 33. The upper base 41 is then rotated in the direction of D2 to closing with lower base 31.

Figure 6C:
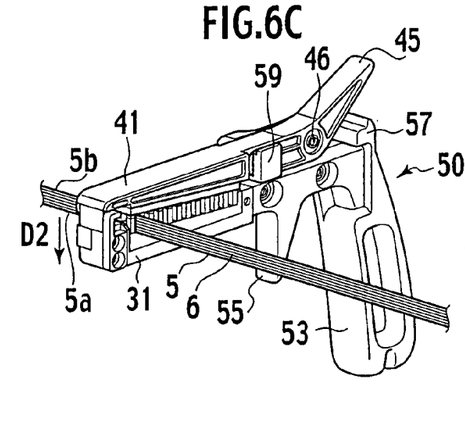

With reference to FIG. 6C, the upper base 41 is further rotated in the direction of D2. The rotation allows the opposite end 5b of the optical-fiber tape 5 to be inserted in an upper channel 43. The rotation allows the upper base 41 to approach the lower base 31. This allows the lower and upper bladed members 32, 42 to be positioned in proximity to each other. The sponge rubber 44 is deformed to resiliently press transversely the opposite end 5b of the optical-fiber tape 5.

Figure 7:
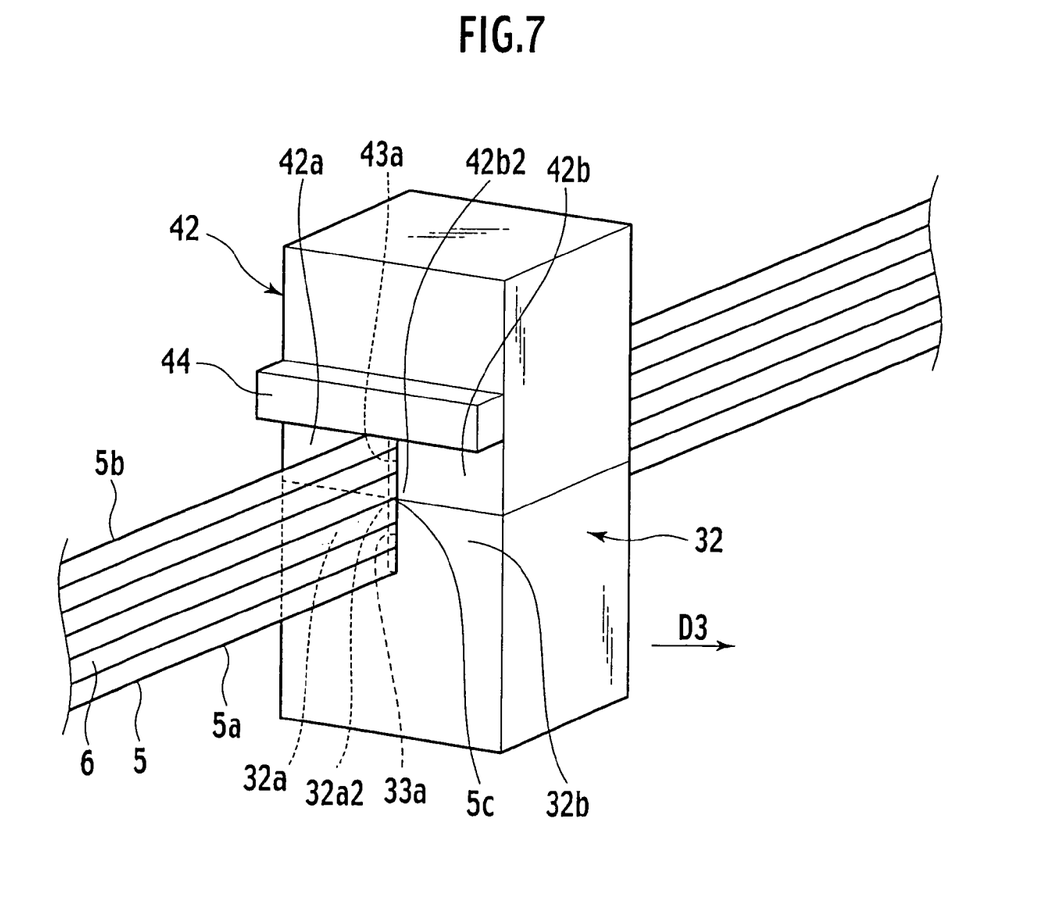
FIG. 7 is an enlarged schematic perspective view for illustrating the separating tool in FIG. 4.

With reference to FIG. 7, the pressing allows the end 5a of the optical-fiber tape 5 to securely contact with the bottom of the channel 33a, thus coinciding the separation location 5c of the optical-fiber tape 5 vertically with the mating corners 32a2, 42b2 of the lower and upper bladed members 32a, 42b. That is, the mating corners 32a2, 42b2 are positioned at the separation location 5c between desired two groups of optical fibers 6.

Figure 6D:
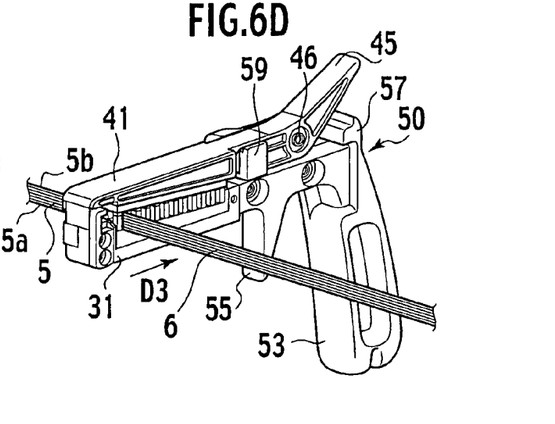

With reference to FIG. 6D, the trigger 55 is pulled towards the grip 53 to displace the lower base 31 in the direction of D3.

In FIG. 7, lower bladed members 32a, 32b slide relative to the upper bladed members 42a, 42b in the direction of D3, allowing mating corners or blades 32a2, 42b2 to pass each other. This allows the mating corners 32a2, 42b2 to shear the optical-fiber tape 5 at the separation location 5c, forming a rip in the tape 5.

Figure 6E:
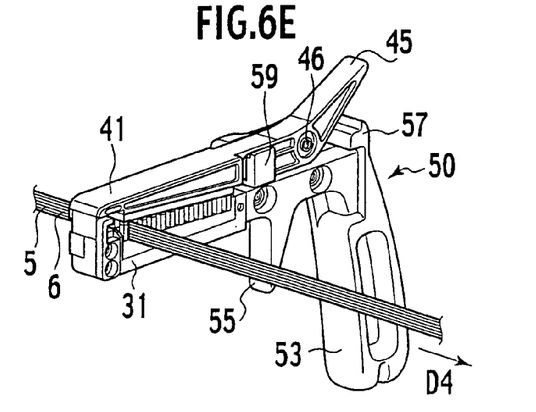

With reference to FIG. 6E, the optical-fiber tape 5 is pulled in the longitudinal direction of D4. The operation allows the rip to be extended longitudinally in the optical-fiber tape 5, thereby separating the optical-fiber tape 5 into two pieces. The separation allows a group of optical fibers 6 to be divided into the two groups with respective numbers.

Although the invention has been described above by reference to exemplary embodiments thereof, the invention is not limited to these embodiments. Modifications and variations of these embodiments will occur to those skilled in the art, in light of the above teachings, without departing from the spirit and scope of the invention as defined by the following claims.

What is claimed is:

1. A separator for an optical-fiber tape, the optical-fiber tape including a group of optical-fibers extending in parallel with each other, the separator comprising:
   a supporting member configured to support a length of the optical-fiber tape along a first lateral edge thereof;
   a positioner configured to apply a resilient force to the length of the optical-fiber tape along a second lateral edge thereof, wherein the first lateral edge and second lateral edge are on opposite sides of the optical fiber tape; and
   a separation member configured to separate a first portion of the length of the optical-fiber tape by shearing the optical-fiber tape along the direction of extension of the group of optical fibers.

2. The separator of claim 1, wherein the positioner compresses the optical fiber tape to correct errors in a width of the optical-fiber tape to maintain alignment of the separation member and a separation location of the optical-fiber tape.

3. The separator of claim 1, wherein the supporting member supports the length of the optical-fiber tape in a supporting direction perpendicular to the direction of extension of the group of optical fibers.

4. The separator of claim 1, wherein the positioner applies the resilient force along the length of the optical-fiber tape in a resilient force direction perpendicular to the direction of extension of the group of optical fibers.

5. The separator of claim 1, wherein:
   the supporting member further comprises a channel wherein a second portion of the length of the optical-fiber tape is contained; and
   the second portion of the length of the optical-fiber tape corresponds to a remainder of the length of the optical-fiber tape not including the first portion.

6. The separator of claim 5, wherein the first portion of the length of the optical-fiber tape extends from an edge of the supporting member to an outer surface of the positioner.

7. The separator of claim 1, wherein the optical-fiber tape is planar.

8. The separator of claim 1, wherein the positioner comprises a spring.

9. The separator of claim 1, wherein the positioner comprises a spring and press plate.

10. The separator of claim 1, wherein the positioner comprises a pressure cylinder.

11. The separator of claim 1, wherein the positioner comprises an elastic material.

12. The separator of claim 1, wherein:
   the positioner comprises a material having an elastic force; and the material having an elastic force is formed from an original material that is free from elastic force.

13. The positioner of claim 1, wherein:
the positioner comprises a material having an elastic force and a material free from elastic force; and
wherein the material having an elastic force is formed from an original material that is free from elastic force.

14. A separator for an optical-fiber tape, the optical-fiber tape including a group of optical-fibers, the separator comprising:
a pair of blades configured so that a length of the optical-fiber tape is contained therebetween, and so that the pair of blades pass each other during operation to shear the length of the optical-fiber tape, thus separating the group of optical-fibers into two groups of optical fibers; and
a positioner configured to resiliently press the length of the optical-fiber tape so that the pair of blades are positioned between said two groups of optical fibers, wherein:
the pair of blades has a channel therebetween; and
the positioner resiliently presses the length of the optical-fiber tape into the channel so that a lateral edge of the length of the optical-fiber tape is positioned along a bottom of the channel.

15. The separator of claim 14, wherein a first blade of the pair of blades supports the length of the optical-fiber tape along a first lateral edge thereof, and the positioner resiliently presses the length of the optical fiber tape along a second lateral edge thereof, wherein the first lateral edge and second lateral edge are on opposite sides of the optical fiber tape.

16. The separator of claim 14, wherein a first blade of the pair of blades supports the length of the optical-fiber tape in a supporting direction perpendicular to the direction of extension of the group of optical fibers.

17. The separator of claim 14, wherein the positioner applies a resilient force along the length of the optical-fiber tape in a resilient force direction perpendicular to the direction of extension of the group of optical fibers.

18. The separator of claim 14, wherein the first blade further comprises a channel wherein one of the groups of optical fibers is contained.

19. The separator of claim 14, wherein the optical-fiber tape is planar.

20. The separator of claim 14, wherein the positioner comprises a spring.

21. The separator of claim 14, wherein the positioner comprises a spring and press plate.

22. The separator of claim 14, wherein the positioner comprises a pressure cylinder.

23. The separator of claim 14, wherein the positioner comprises an elastic material.

24. The separator of claim 14, wherein:
the positioner comprises a material having an elastic force; and
the material having an elastic force is formed from an original material that is free from elastic force.

25. The separator of claim 14, wherein:
the positioner further comprises a material having an elastic force and a material free from elastic force; and
the material having an elastic force is formed from an original material that is free from elastic force.

26. The separator of claim 14, wherein:
the separator comprises a plurality of pairs of blades arranged successively on a support structure;
each of the pair of blades has a channel therebetween; and
the positioner extends closer to each successive interface of the pairs of blades on the support structure.

* * * * *